Dec. 3, 1929.　　　　J. L. COLLINS　　　　1,738,037
SPRING BUSHING
Filed May 21, 1928　　　2 Sheets-Sheet 1
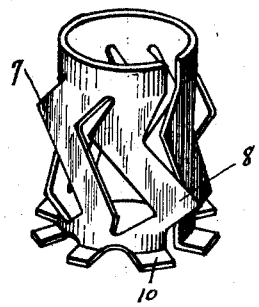
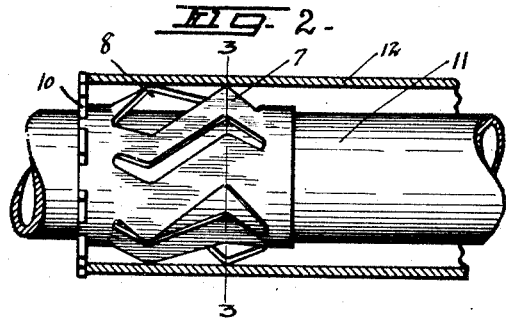
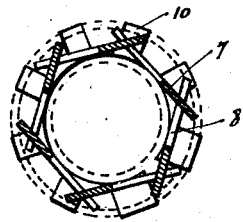
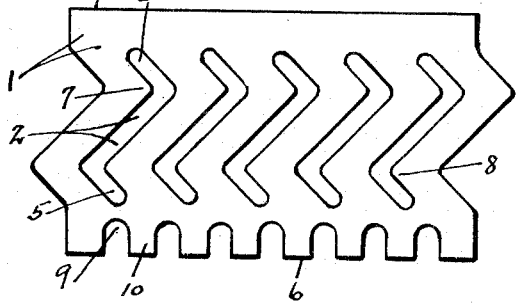
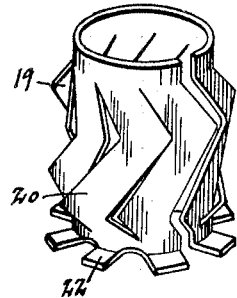
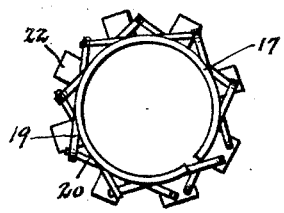
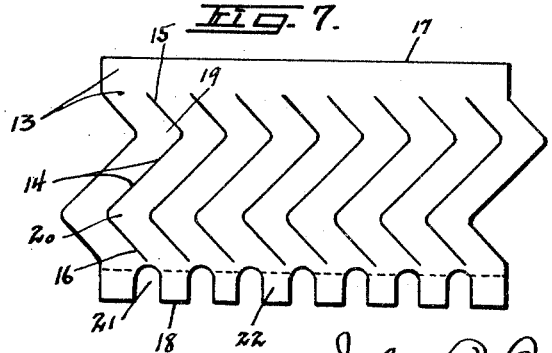

Dec. 3, 1929. J. L. COLLINS 1,738,037
SPRING BUSHING
Filed May 21, 1928   2 Sheets-Sheet 2
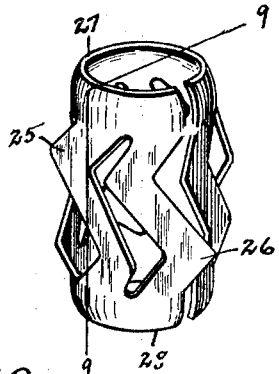
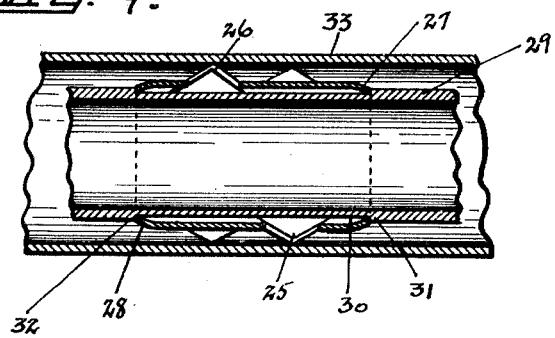
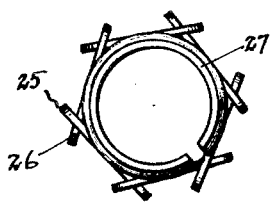
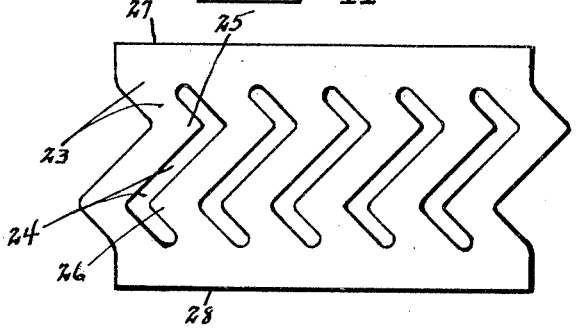

Patented Dec. 3, 1929

1,738,037

UNITED STATES PATENT OFFICE

JOHN L. COLLINS, OF SYRACUSE, NEW YORK, ASSIGNOR TO THE WARNER CORPORATION, OF SYRACUSE, NEW YORK, A CORPORATION OF INDIANA

SPRING BUSHING

Application filed May 21, 1928. Serial No. 279,571.

This invention relates to a new and improved spring bushing.

Although it will be obvious that my device is adapted to be used in numerous places and under different conditions of assembly of parts in mechanical structures it is particularly well fitted to be used in the steering wheel assembly of motor vehicles. It is usual in the assembly of steering posts of motor vehicles to have inside the steering column two concentrically disposed tubes of different diameters which may be rotated, the rotation of one controlling the operation of the carbureter of the motor vehicle and the rotation of the other controlling the operation of the commutator of the motor vehicle. Of necessity these tubular members are in close juxtaposition, and the main object of my invention is to produce a spring bushing which may be disposed between these two tubular members to hold them in spaced relation so that they will never come into contact and produce a noise or rattle because of such contact.

Another object of my invention is to produce a spring bushing of such a design that when once in position it will be securely fixed against movement and cannot come out of place.

Another object is to design a spring bushing which can be made from a stamping of appropriate material so that its manufacturing cost will be minimized.

Another object is to design a device in which the parts are so disposed that the device, when in position, will be held against rotation irrespective of the rotary movement of the tubular members in which it is assembled.

Other objects and uses relate to the size, shape and arrangement of parts of my device all as will more fully appear from the following description taken in connection with the accompanying drawings in which:—

Figure 1 is a perspective view of the preferred form of my device.

Figure 2 is an elevation of my device assembled between two concentric tubes, the outer tube being shown in sections.

Figure 3 is a section on line 3—3 of Figure 2.

Figure 4 is an elevation of the blank from which my device is formed.

Figure 5 is a perspective view of a modified form of my device.

Figure 6 is an end view of the device shown in Figure 5.

Figure 7 is an elevation of the blank from which the device shown in Figure 5 is formed.

Figure 8 is a perspective view of another modification of my device.

Figure 9 is a section on line 9—9 of Figure 8 with my device assembled between two concentric tubes, the tubes also being shown in section.

Figure 10 is an end view of the device shown in Figure 8.

Figure 11 is an elevation of the blank from which the device shown in Figure 8 is formed.

My device may be constructed of any appropriate material having an inherent resiliency, as for example, spring phosphor bronze, and is constructed by forming a blank —1— here shown as approximately rectangular in shape in which are placed by punching or other convenient means a plurality, in this case shown as five, of zigzag slots —2— having their upper ends 3 disposed on a line which, when extended, preferably forms an angle of not less than 45 degrees with the upper edge 4 of the blank. The lower ends 5 of the slots 2 are disposed on a line which, when extended, preferably forms an angle of not less than 45 degrees with the bottom edge 6 of the blank. The formation of slots —2— in blank —1— forms a plurality, in this case shown as five, of wedge shaped portions 7 having their apices disposed on a line adjacent the upper end of slots —2—. There are also formed by this operation a similar series of wedge shaped portions —8— adjacent the lower ends of slots —2— also with their apices on a line, the apices of the portions —7— pointing in a direction opposite to the direction in which the apices of portions —8— point.

At the same operation in which the slots —2— are formed there are formed on the lower edge of blank —1— a plurality, in this case shown as seven, of slots —9— forming therebetween a plurality, in this case shown as six, of downwardly extending tongues —10—. The ends of blank —1— are cut away so that their outline corresponds to the outline of the next adjacent slot —2—.

The blank is then bent into tubular form as shown in Figure 1 and during the bending operation the portions 7 and the portions 8 are bent outwardly from the body —1— and the tongues —10— are bent outwardly to a position where they form approximately right angles with the adjacent portion of blank —1—.

As perhaps may best be seen from Figure 2 the finished size is such that the device will have approximately the same inside diameter as the outside diameter of the tube 11 on which it is assembled. The distance which the members —7— and —8— are bent outwardly from the main portion of body —1— will depend upon the difference between the outside diameter of the tube 11 upon which my device is assembled and the inside diameter of the tube 12 inside of which tube 11 and my device are assembled but such outward bending of members 7 and 8 should be a sufficient amount so that the diameter of the circle in which the apices of members 7 and 8 are disposed will be greater than the inside diameter of tube 12 so that the apices of portions 7 and 8, due to the inherent resiliency of the metal of which my device is constructed, will at all times be in yielding contact with the inside of the tubular member 12 when the device is in position.

As perhaps may best be seen from Figure 2 the distance between the outside edges of opposed tongues —10— is at least as great as the outside diameter of tubular member 12 so that when my device is inserted in tubular member 12 the tongues 10 will contact with the end of tubular member 12 and prevent the further inward movement of the device.

When assembled in position the tubular member 11 will at all times be cushioned from the tubular member —12— so that either or both may be permitted a movement towards and from each other but will at all times be held out of contact with each other so that no rattling or noise can occur.

The preferred form of my device, as just described, permits its use between two tubular members in which the outside diameter of the inner tubular member may approach very closely the inside diameter of the outside tubular member because the slots 2 permit the portions 7 and 8 to be forced inwardly into approximately the same form as the remainder of body 1 without any danger of adjacent portions of body —1— overlapping or wedging to prevent such inward movement.

In Figure 5 I have shown a modified form of my device which is made in the same way as the device just described but in which I form in a blank —13— of similar size and shape to blank —1— a plurality, in this case shown as eight, of zigzag slits —14—. The ends —15— and —16— of slits —14— are disposed in the same angular relation to the edges 17 and 18, respectively, of body —13— as ends 3 and 5 of slots 2 were disposed to edges 4 and 6 of body —1—. Similarly the wedge shaped portions 19 and 20 of body —13— have their apices disposed in different directions as was the case with the apices of portions 7 and 8 of body —1—. There are also formed in the bottom edge 18 of body —13— a plurality, in this case shown as seven, of slots —21— forming therebetween a plurality, in this case shown as six, of tongues —22—.

The modified form of my device is bent into tubular form in the same manner as described in the case of the preferred form of my device with portions 19 and 20 bent outwardly and with tongues —22— bent outwardly into approximately right angular relation with the main portion of body —13—. The result may best be seen in Figure 5. This modified form of my device is assembled with tubular members such as members 11 and 12 in the same manner as heretofore described. The difference between the two forms of the device being that the last described form having only slits as 14 in the body 13 requires that the outside diameter of the inner tubular member as 11 shall be considerably less than the inside diameter of a tubular member such as 12 because of the fact that when the portions 19 and 20 are sprung inwardly the adjacent portions of the device will be apt to catch and interfere with such inward movement. On the other hand, it is a preferable form of device to be used when the clearance between the tubular members as 11 and 12 is such that it may be used because in a device of the same size it permits the forming of eighteen contact members 19 and 20 as compared with twelve contact members 7 and 8 in the first described device and therefore is stronger and more resilient.

In Figures 8, 9, 10 and 11 I show another modification of my device for use where it is assembled with tubular members between their ends. In such circumstances a different locking means than tongues such as —10— and —22— heretofore described is required. In forming the modified form of my device shown in Figure 8 I form a blank 23 similar to blanks 1 and 13 in which are formed zigzag slots 24 similar in shape and position to slots 2 hitherto described. The formation of slots 24 produces in blank 23 a plurality, in this case shown as five, of wedge shaped members 25 having their apices in line and pointing in the same direction. There are also formed a plurality, in this case shown as five, of wedge shaped portions 26 having their apices in line and pointing in a direction opposite to the direction in which the apices of members 25 point.

The top edge 27 and bottom edge 28 of blank 23 are left untouched.

Blank 23 is then bent into tubular form and during the bending operation the members 25 and 26 are bent outwardly and the edges 27 and 28 are bent slightly inwardly as perhaps may best be seen from Figure 9. The inner tubular member 29 with which my device is to be used is provided with a circumferential groove or slot 30 having a shoulder 31 at one end and a shoulder 32 at the other end. The diameter of the finished device is such that when it is assembled on tubular member 29 the bent in edge 27 will rest against the shoulder 31 and the bent in edge 28 will rest against the shoulder 32 of slot 30 so that the device will be held against longitudinal movement in relation to tubular member 29. When my device is in position on tubular member 29 the two pieces are inserted into the outside tubular member 33. The distance which members 25 and 26 are bent outwardly, when the device is bent into tubular form, depends upon the difference between the outside diameter of tubular member 29 and the inside diameter of tubular member 33 but it should be such a distance that the diameter of a circle intersected by members 25 in one case and by members 26 in another should be slightly greater than the inside diameter of tubular member 33 so that tubular member 33 will tend to force members 25 and 26 inwardly.

It will also be obvious that the last described modified form of my device may be constructed, if desired, in the manner in which the modified form of my device shown in Figures 5, 6 and 7 was constructed. That is to say, slits similar to slits 14 may be used instead of slots 24.

As heretofore stated it is preferable that the ends of the zigzag slots and slits heretofore described be disposed on a line which, when extended, would form an angle of not less than 45 degrees with the adjacent edge of the blank from which the device is formed. By using such angular relation the edges of the outturned wedge shaped members such as 7 and 8 will be disposed in angular relation to the end of the tubular member such as 12 into which the device is to be inserted and the more acute such angular relation is the easier it will be to insert the device in such tubular member. However, it will be obvious that there need be no definite limitation as to such angular relation and the device could be made where no such angular relation existed but it would not be as easy to assemble it in the desired position.

Such angular relation is, however, desirable for another reason because when it exists the pointed ends of the members 7, for example, will be directed against the inner surface of the tubular member as 12 in one direction and in consequence will resist the relative movement of the device and the tubular member. The points of the opposed members 8 will be directed in the opposite direction against the inner surface of the tubular member 12 to also resist relative movement between the device and the tubular member. These forces being equal and exerted in opposite directions the device itself will be held against rotation irrespective of whether tubular member 11 or tubular member 12 is rotated in performing the function for which it was designed.

It will also be obvious that my device may be made of any size desired and that the blank from which it is made may be of other shapes than the approximate rectangle here shown.

It will also be obvious that my device is adapted for use wherever it is desired to maintain concentrically disposed tubular members in spaced relation, for altho I have shown and described a specific structure and form of part as an exemplification of an embodiment of my invention I do not desire to restrict myself to the exact size, shape or arrangement of parts as various changes may be made within the scope of the appended claims.

I claim:

1. In a device of the class described, a tubular body having portions thereof bent outwardly to form a plurality of wedge shaped portions disposed circumferentially of the body and having their pointed ends disposed in the same direction, other portions of the tubular body being bent outwardly to form a plurality of wedge shaped portions extending circumferentially of the body in spaced relation to the first named wedge shaped portions and having their pointed ends disposed in a direction opposite to the direction in which the pointed ends of the first named bent out portions are disposed, and a plurality of laterally extending tongues disposed circumferentially on one end of the tubular body.

2. In a device of the class described, a tubular body, a plurality of slots disposed circumferentially of the body, a portion of the body at one end of a slot being bent outwardly to form a wedge shaped portion having its point disposed in one direction and a portion of the body at the other end of the slot being bent outwardly to form a wedge shaped portion with its pointed end disposed in a direction opposite to the direction in which the pointed end of the first named portion is disposed.

3. In a device of the class described, a tubular body, a plurality of slots disposed circumferentially of the body, a portion of the body at one end of a slot being bent outwardly to form a wedge shaped portion having its point disposed in one direction and a portion of the body at the other end of the slot being bent outwardly to form a wedge shaped portion with its pointed end disposed in a direction opposite to the direction in which the pointed end of the first named portion is disposed, and a plurality of laterally extending tongues disposed circumferentially on one end of the tubular body.

4. In a device of the class described, a tubular body, a plurality of slots disposed circumferentialy of the body, a portion of the body at one end of each slot being bent outwardly to form wedge shaped portions extending tangentially from the periphery of the body, and portions of the body at the other ends of the slots being bent outwardly to form wedge shaped portions extending tangentially from the periphery of the body, and being in staggered relation to the first named outwardly bent portions.

5. In a device of the class described, a tubular body, a plurality of slots disposed circumferentially of the body, a portion of the body at one end of each slot being bent outwardly to form wedge shaped portions extending tangentially from the periphery of the body, and portions of the body at the other ends of the slots being bent outwardly to form wedge shaped portions extending tangentially from the periphery of the body, and being in staggered relation to the first named outwardly bent portions, and a plurality of laterally extending tongues disposed circumferentially on one end of the tubular body.

In witness whereof I have hereunto set my hand this 14th day of May, 1928.

JOHN L. COLLINS.